United States Patent
Ema et al.

(10) Patent No.: US 12,092,499 B2
(45) Date of Patent: Sep. 17, 2024

(54) DATA MANAGEMENT SYSTEM, DATA MANAGEMENT METHOD, AND RECORDING MEDIUM RECORDING DATA MANAGEMENT PROGRAM

(71) Applicant: Yokogawa Electric Corporation, Tokyo (JP)

(72) Inventors: Nobuaki Ema, Tokyo (JP); Yoshitaka Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 540 days.

(21) Appl. No.: 17/367,411

(22) Filed: Jul. 4, 2021

(65) Prior Publication Data

US 2022/0042829 A1 Feb. 10, 2022

(30) Foreign Application Priority Data

Aug. 4, 2020 (JP) .................................. 2020-132480

(51) Int. Cl.
*G06Q 50/06* (2024.01)
*G01D 7/00* (2006.01)
*G01D 9/00* (2006.01)
*G01D 9/02* (2006.01)
*G06Q 50/04* (2012.01)

(52) U.S. Cl.
CPC .................. *G01D 9/02* (2013.01); *G01D 7/00* (2013.01); *G01D 9/005* (2013.01); *G06Q 50/04* (2013.01); *G06Q 50/06* (2013.01)

(58) Field of Classification Search
None
See application file for complete search history.

(56) References Cited

U.S. PATENT DOCUMENTS 6,100,901 A * 8/2000 Mohda .................... G06F 18/40
345/440
6,230,064 B1 * 5/2001 Nakase .................. G06Q 10/06
715/764

(Continued)

FOREIGN PATENT DOCUMENTS

JP 2011059873 A 3/2011
JP 2012098534 A * 5/2012

(Continued)

OTHER PUBLICATIONS

Truong, "Fuzzy-Based Sensor Search in the Web of Things", 2012, IEEE, pp. 1-8 (Year: 2012).*

(Continued)

*Primary Examiner* — Jason Lin

(57) ABSTRACT

Provided is a data management system including an environment data acquisition unit configured to acquire, from an environment sensor, environment data obtained by measuring a production environment where a product is produced from a raw material, a sensor selection unit configured to select a specific sensor from among measurement sensors, each of which is configured to measure a production target serving as a target of the production, according to a relevance with respect to the environment sensor, and a parameter setting unit configured to set a measurement parameter in the specific sensor based on the environment data.

19 Claims, 6 Drawing Sheets

(56) References Cited

U.S. PATENT DOCUMENTS

| | | | |
|---|---|---|---|
| 7,787,969 B2 * | 8/2010 | Grichnik | G05B 19/0423 703/2 |
| 10,584,986 B2 * | 3/2020 | Hara | G05B 23/0208 |
| 2002/0062162 A1 * | 5/2002 | Bunkofske | G05B 23/0221 700/51 |
| 2005/0197806 A1 * | 9/2005 | Eryurek | G05B 23/0221 702/188 |
| 2005/0209820 A1 * | 9/2005 | Inoue | G05B 23/0232 702/183 |
| 2008/0183423 A1 * | 7/2008 | Ide | G06F 18/40 702/180 |
| 2011/0172931 A1 | 7/2011 | Murthy | |
| 2016/0170742 A1 * | 6/2016 | Pallath | G06F 8/34 717/120 |
| 2017/0131705 A1 | 5/2017 | Ishii | |
| 2017/0146970 A1 * | 5/2017 | Joo | G05B 19/042 |
| 2019/0041235 A1 * | 2/2019 | Ko | G01D 5/00 |
| 2019/0086903 A1 | 3/2019 | Ochiai | |
| 2019/0098035 A1 * | 3/2019 | Periaswamy | G05B 19/0428 |
| 2019/0370673 A1 * | 12/2019 | Utsumi | G06N 7/00eb |
| 2020/0204882 A1 | 6/2020 | Gang | |
| 2021/0109213 A1 * | 4/2021 | Hamlin | G01S 7/4868 |

FOREIGN PATENT DOCUMENTS

| | | |
|---|---|---|
| JP | 2017091258 A | 5/2017 |
| JP | 2018077237 A | 5/2018 |
| JP | 2018206081 A | 12/2018 |
| WO | 2017169282 A1 | 10/2017 |
| WO | 2019028269 A2 | 2/2019 |

OTHER PUBLICATIONS

Office Action issued for counterpart European Application No. 21184665.4, issued by the European Patent Office on Dec. 5, 2022.
Office Action issued for counterpart Japanese Application No. 2020-132480, issued by the Japanese Patent Office on Jun. 27, 2023 (drafted on Jun. 20, 2023).
Extended European Search Report for counterpart European Application No. 21184665.4, issued by the European Patent Office on Dec. 17, 2021.

* cited by examiner

WITH RESPECT TO ENVIRONMENT SENSOR 30i

| RELEVANCE | MEASUREMENT SENSOR | |
|---|---|---|
| 0.93 | 20b4 | ← SELECTED AS SPECIFIC SENSOR |
| 0.87 | 20b3 | |
| 0.81 | 20a1 | ← SELECTED AS SPECIFIC SENSOR |
| 0.72 | 20b5 | |
| 0.45 | 20b2 | |

*FIG. 5*

DATA MANAGEMENT SYSTEM, DATA MANAGEMENT METHOD, AND RECORDING MEDIUM RECORDING DATA MANAGEMENT PROGRAM

The contents of the following Japanese patent application are incorporated herein by reference:
NO. 2020-132480 filed in JP on Aug. 4, 2020

BACKGROUND

1. Technical Field

The present invention relates to a data management system, a data management method, and a recording medium recording a data management program.

2. Related Art

Patent document 1 describes "acquiring external device information such as a state of a surrounding environment of a field device 10 and an operational state of other equipment which is not to be acquired by a sensor 11 included in the field device 10 itself".

CITATION LIST

Patent Document

Patent document 1: Japanese Patent Application Publication No. 2017-091258

SUMMARY

According to a first aspect of the present invention, there is provided a data management system. The data management system may include an environment data acquisition unit configured to acquire, from an environment sensor, environment data obtained by measuring a production environment where a product is produced from a raw material. The data management system may include a sensor selection unit configured to select a specific sensor from among measurement sensors, each of which is configured to measure a production target serving as a target of the production, according to a relevance with respect to the environment sensor. The data management system may include a parameter setting unit configured to set a measurement parameter in the specific sensor based on the environment data.

The sensor selection unit may decide the relevance of the measurement sensor based on a distance from the environment sensor.

The sensor selection unit may decide the relevance of the measurement sensor based on a type of a physical quantity measured by the environment sensor.

The sensor selection unit may decide the relevance of the measurement sensor based on a correlation between a time-series change of the environment data measured by the environment sensor and a time-series change of measurement data measured by the measurement sensor.

The sensor selection unit may decide the relevance of the measurement sensor based on an actual record of being selected as the specific sensor.

The data management system may further include a list output unit configured to output a list of candidate sensors as the measurement sensors having the relevance higher than a predetermined threshold, and the sensor selection unit may select the specific sensor from among the candidate sensors according to a user input.

The parameter setting unit may change the measurement parameter when the environment data is out of a predetermined range.

The parameter setting unit may initialize the measurement parameter when the environment data is within the predetermined range.

The parameter setting unit may set a cycle for measuring the production target as the measurement parameter.

The parameter setting unit may set a sensitivity for measuring the production target as the measurement parameter.

The environment data acquisition unit may acquire at least any of a vibration, a temperature, a humidity, an illuminance, an odor, a gas concentration, a pressure, an air pressure, a stress, a magnetic field, a sound, and an image in the production environment as the environment data.

The data management system may further include a measurement data acquisition unit configured to acquire measurement data obtained by measuring the production target from the measurement sensor, and a data recording unit configured to record the measurement data.

The data recording unit may further record information indicating timing of setting change of the measurement parameter.

According to a second aspect of the present invention, there is provided a data management method. The data management method may include acquiring, from an environment sensor, environment data obtained by measuring a production environment where a product is produced from a raw material. The data management method may include selecting a specific sensor from among measurement sensors, each of which is configured to measure a production target serving as a target of the production, according to a relevance with respect to the environment sensor. The data management method may include setting a measurement parameter in the specific sensor based on the environment data.

According to a third aspect of the present invention, there is provided a non-transitory computer-readable recording medium having recorded thereon a data management program. The data management program may be executed by a computer. The data management program may cause the computer to function as an environment data acquisition unit configured to acquire, from an environment sensor, environment data obtained by measuring a production environment where a product is produced from a raw material. The data management program may cause the computer to function as a sensor selection unit configured to select a specific sensor from among measurement sensors, each of which is configured to measure a production target serving as a target of the production, according to a relevance with respect to the environment sensor. The data management program may cause the computer to function as a parameter setting unit configured to set a measurement parameter in the specific sensor based on the environment data.

The summary clause does not necessarily describe all necessary features of the embodiments of the present invention. The present invention may also be a sub-combination of the features described above.

BRIEF DESCRIPTION OF THE DRAWINGS

FIG. 5 illustrates one example of a list of candidate sensors which is output by the data management system 100 according to the modified example of the present embodiment.

DESCRIPTION OF EXEMPLARY EMBODIMENTS

Hereinafter, the present invention will be described by way of embodiments of the invention, but the following embodiments are not intended to limit the invention according to the claims. In addition, not all combinations of features described in the embodiments necessarily have to be essential to solving means of the invention.

Figure 1:
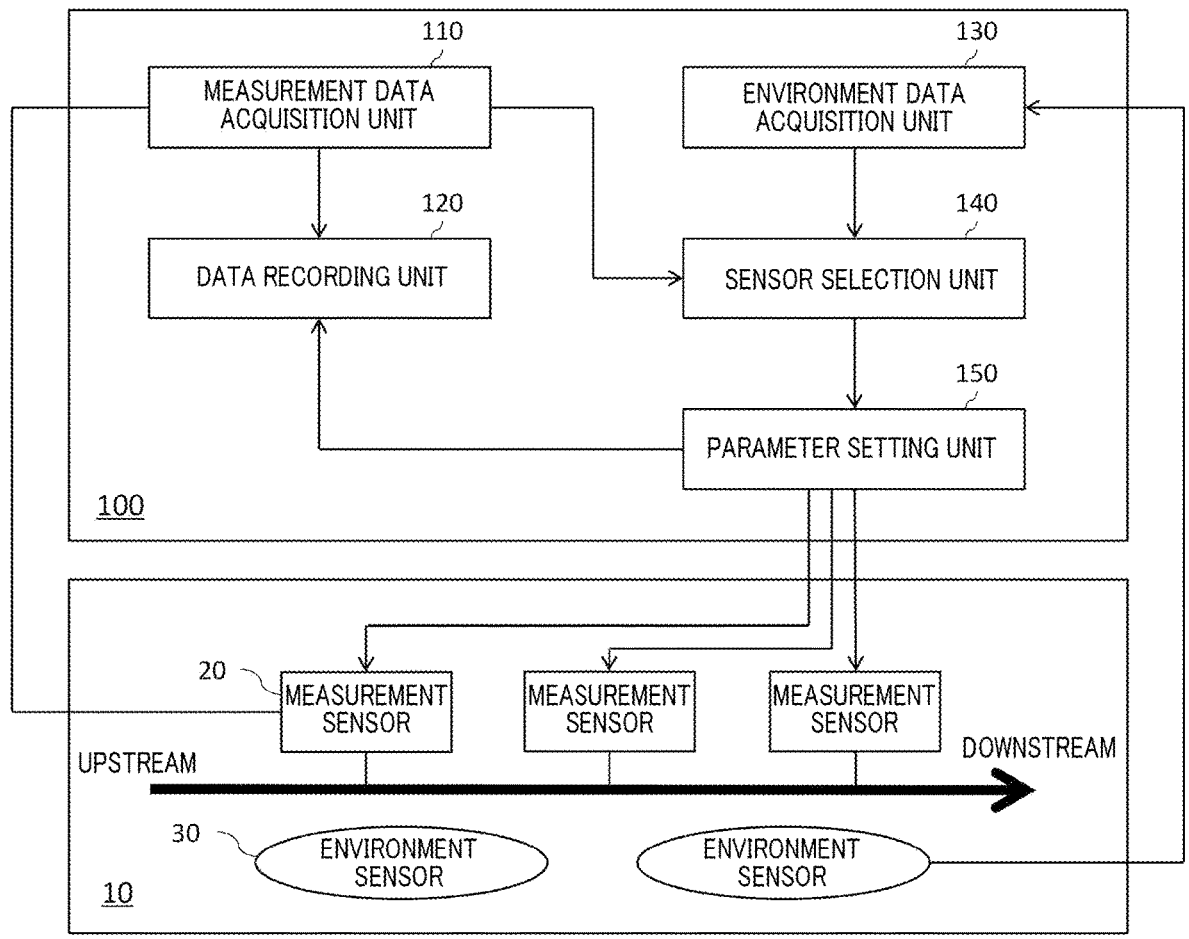
FIG. 1 illustrates one example of a block diagram of a data management system 100 according to the present embodiment together with a plant 10.

FIG. 1 illustrates one example of a block diagram of a data management system 100 according to the present embodiment together with a plant 10. In the present drawing, a case where the data management system 100 sets data acquired from a plurality of sensors disposed in the plant 10 as a management target has been illustrated as one example. However, the case is not limited to this. The data management system 100 may set measurement data from one or a plurality of sensors disposed in any locations different from the plant 10 as the management target.

The plant 10 may be not only an industrial plant such as a chemical plant but also a plant that manages and controls a well source such as a gas field or an oil field and its surrounding area, a plant that manages and controls power generation such as hydroelectric, thermal, or nuclear power generation, a plant that manages and controls environmental power generation such as solar or wind power generation, a plant that manages and controls water and sewerage or a dam, and the like. In the plant 10, when a product is produced from a raw material, a process proceeds from upstream to downstream. One or a plurality of measurement sensors 20 and one or a plurality of environment sensors 30 may be disposed in the plant 10 described above.

The measurement sensor 20 is configured to measure a physical quantity of a production target serving a target of the production in the plant 10. The measurement sensor 20 may be a sensor installed, for example, in an operational technology (OT) region (for example, a sensor for process control (measurement)), or may be an industrial sensor connected to, or integrally configured with, one or a plurality of field devices disposed in the plant. As one example, the measurement sensor 20 may be able to acquire measurement data obtained by measuring a physical quantity such as a flow rate, a pressure, and a temperature in a raw material (an ingredient and a material), a semifinished product, a product, and the like serving as a production target.

The environment sensor 30 is configured to measure a production environment where the product is produced from the raw material. The environment sensor 30 may be an Internet of Things (IoT) sensor retrofitted in the plant 10, for example. As one example, the environment sensor 30 may be able to acquire environment data obtained by measuring a physical quantity such as a vibration, a temperature, a humidity, an illuminance, an odor, a gas concentration, a pressure, an air pressure, a stress, a magnetic field, a sound, and an image in the production environment.

The data management system 100 according to the present embodiment acquires the environment data from the environment sensor 30. Then, the data management system 100 sets a measurement parameter in a specific sensor selected from among the measurement sensors 20 based on the acquired environment data.

The data management system 100 may be a computer such as a personal computer (PC), a tablet computer, a smartphone, a workstation, a server computer, or a general purpose computer, or may be a computer system in which a plurality of computers are connected to each other. The above-described computer system is also a computer in a broad sense. In addition, the data management system 100 may be implemented by one or more virtual computers that can be executed in the computer. Alternatively, the data management system 100 may be a dedicated computer designed for data management, or may be dedicated hardware achieved by a dedicated circuit. In addition, when the data management system 100 can be connected to the Internet, the data management system 100 may be achieved by cloud computing.

The data management system 100 includes a measurement data acquisition unit 110, a data recording unit 120, an environment data acquisition unit 130, a sensor selection unit 140, and a parameter setting unit 150. Note that these blocks are functional blocks that are respectively separated in terms of functions, and may not necessarily be consistent with an actual device configuration. That is, even when one block is illustrated in the present drawing, the block may not necessarily be configured by a single device. In addition, even when separate blocks are illustrated in the present drawing, those blocks may not necessarily be configured by separate devices.

The measurement data acquisition unit 110 is configured to acquire the measurement data obtained by measuring the production target from the measurement sensor 20. As one example, the measurement data acquisition unit 110 may be a communication unit configured to acquire the measurement data obtained by measuring the production target from each of the plurality of measurement sensors 20 in time series via a communication network, for example. Note that in the above-described explanation, a case where the measurement data acquisition unit 110 acquires the measurement data from each of the plurality of measurement sensors 20 via the communication network has been illustrated as one example, but the case is not limited to this. The measurement data acquisition unit 110 may acquire the measurement data from each of the plurality of measurement sensors 20, for example, via other means different from the communication network such as a user input or various memory devices.

Such a communication network may be a network connecting a plurality of computers. For example, the communication network may be a global network in which a plurality of computer networks are mutually connected, and as one example, the communication network may be the Internet using an Internet protocol. Alternatively, the communication network may be achieved by a dedicated line. That is, the measurement data acquisition unit 110 can directly or indirectly exchange and acquire the measurement data with a mobile phone, a smartphone, a fourth generation (4G) terminal, and a fifth generation (5G) terminal, and the like.

The measurement data acquisition unit 110 may acquire the measurement data of a flow rate, a pressure, a temperature, a combination of these, and the like, for example, in a raw material, a semifinished product, a product, and the like serving as the production target from each of the plurality of measurement sensors 20. In addition, the measurement data acquisition unit 110 may acquire a value generated using a mathematical expression based on these pieces of data as the measurement data. The measurement data acquisition unit 110 supplies the measurement data acquired from each of the plurality of measurement sensors 20 to the data recording unit 120 and the sensor selection unit 140.

The data recording unit 120 is configured to record the measurement data. As one example, the data recording unit 120 may record the measurement data from the plurality of measurement sensors 20 supplied from the measurement data acquisition unit 110 in time series for each of the measurement sensors 20.

The environment data acquisition unit 130 is configured to acquire, from the environment sensor 30, the environment data obtained by measuring the production environment where the product is produced from the raw material. As one example, similarly as in the measurement data acquisition unit 110, the environment data acquisition unit 130 acquires the environment data obtained by measuring the production environment from each of the plurality of environment sensors 30 in time series via the communication network, for example. Note that in the above-described explanation, a case where the environment data acquisition unit 130 acquires the environment data from each of the plurality of environment sensors 30 via the communication network has been described as one example, but the case is not limited to this. Similarly as in the measurement data acquisition unit 110, the environment data acquisition unit 130 may acquire the environment data from each of the plurality of environment sensors 30, for example, via other means different from the communication network such as a user input or various memory devices.

The environment data acquisition unit 130 may acquire at least any of a vibration, a temperature, a humidity, an illuminance, an odor, a gas concentration, a pressure, an air pressure, a stress, a magnetic field, a sound, and an image in the production environment, for example, as the environment data. In addition, the environment data acquisition unit 130 may acquire a value generated using a mathematical expression based on these pieces of data as the environment data. The environment data acquisition unit 130 supplies the environment data acquired from each of the plurality of environment sensors 30 to the sensor selection unit 140.

The sensor selection unit 140 is configured to acquire the measurement data supplied from the measurement data acquisition unit 110. In addition, the sensor selection unit 140 is configured to acquire the environment data supplied from the environment data acquisition unit 130. Then, the sensor selection unit 140 is configured to select a specific sensor from among the measurement sensors 20 measuring the production target serving as the target of the production according to a relevance with respect to the environment sensor 30. At this time, the sensor selection unit 140 may decide the relevance of the measurement sensor 20 based on, for example, a distance from the environment sensor 30. In addition, the sensor selection unit 140 may decide the relevance of the measurement sensor 20 based on, for example, a type of the physical quantity measured by the environment sensor. In addition, the sensor selection unit 140 may decide the relevance of the measurement sensor 20 based on, for example, a correlation between a time-series change of the environment data measured by the environment sensor 30 and a time-series change of the measurement data measured by the measurement sensor 20. This will be described below. The sensor selection unit 140 supplies information related to the selected specific sensor to the parameter setting unit 150.

The parameter setting unit 150 acquires the information related to the specific sensor from the sensor selection unit 140. Then, the parameter setting unit 150 sets a measurement parameter in the specific sensor based on the environment data. At this time, the parameter setting unit 150 may set a cycle for measuring the production target as the measurement parameter for the specific sensor to measure the production environment, for example. In addition, the parameter setting unit 150 may set a sensitivity for measuring the production target as the measurement parameter for the specific sensor to measure the production environment, for example. This will also be described below. According to this configuration, the measurement sensor 20 measures the production target according to the parameter set by the parameter setting unit 150.

In addition, the parameter setting unit 150 may supply setting information related to the set measurement parameter to the data recording unit 120. Such setting information herein may include, for example, information indicating at which timing the measurement parameter is changed (for example, a flag, or the like). According to this configuration, the data recording unit 120 may further record information indicating timing of setting change of the measurement parameter in addition to the measurement data.

Figure 2:
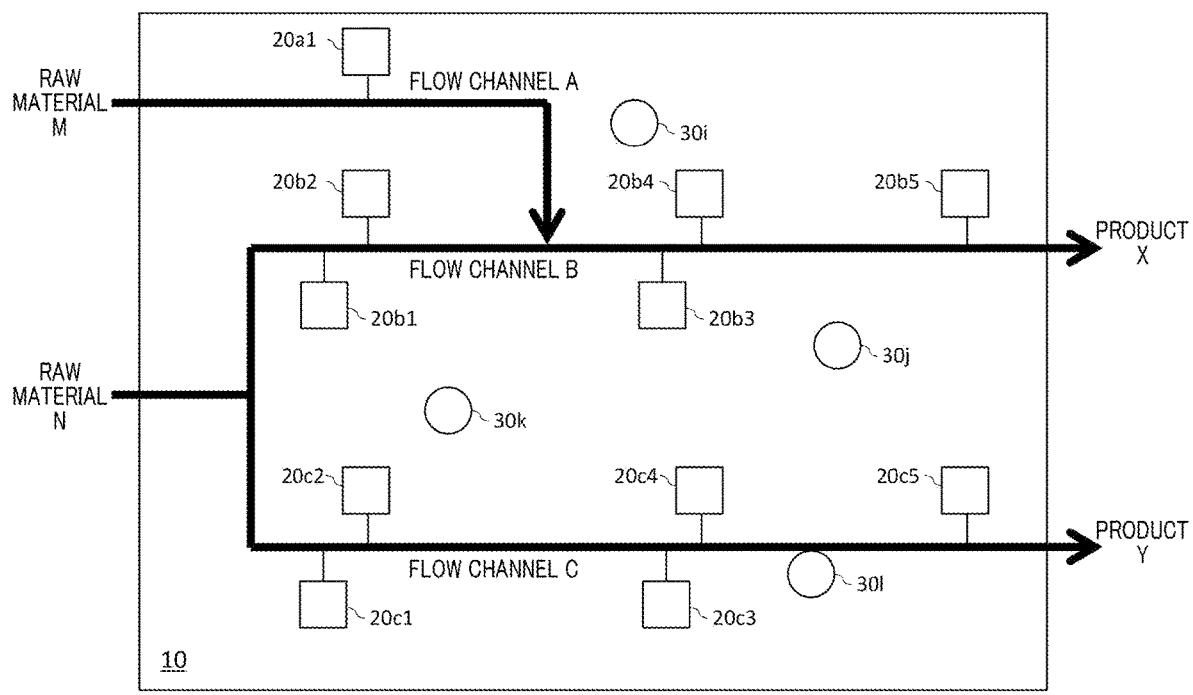
FIG. 2 illustrates an arrangement example of a measurement sensor 20 and an environment sensor 30 which are disposed in the plant 10.

FIG. 2 illustrates an arrangement example of the measurement sensor 20 and the environment sensor 30 which are disposed in the plant 10. In the present drawing, a case where products X and Y are produced from raw materials M and N via flow channels A to C in the plant 10 has been illustrated as one example. As illustrated in the present drawing, a measurement sensor $20a1$ (also referred to as a "measurement sensor $20a$") is disposed in the flow channel A. In addition, a plurality of measurement sensors $20b1$, $20b2$, $20b3$, $20b4$, and $20b5$ (collectively referred to as "measurement sensors $20b$") are disposed in the flow channel B from upstream towards downstream. In addition, a plurality of measurement sensors $20c1$, $20c2$, $20c3$, $20c4$, and $20c5$ (collectively referred to as "measurement sensors $20c$") are disposed in the flow channel C from upstream towards downstream. In addition, the measurement sensors $20a$, $20b$, and $20c$ (collectively referred to as "measurement sensors 20") are disposed. In addition, to measure various production environments in various positions in the plant 10, a plurality of environment sensors $30i$, $30j$, $30k$, and $30l$ (collectively referred to as "environment sensors 30" are disposed in the plant 10. The data management system 100 according to the present embodiment acquires the environment data from the environment sensors 30 disposed in the plant 10 described above, for example. Then, the data management system 100 sets the measurement parameter in the specific sensor selected from among the measurement sensors 20 based on the acquired environment data. This will be described in detail using a flow.

Figure 3:
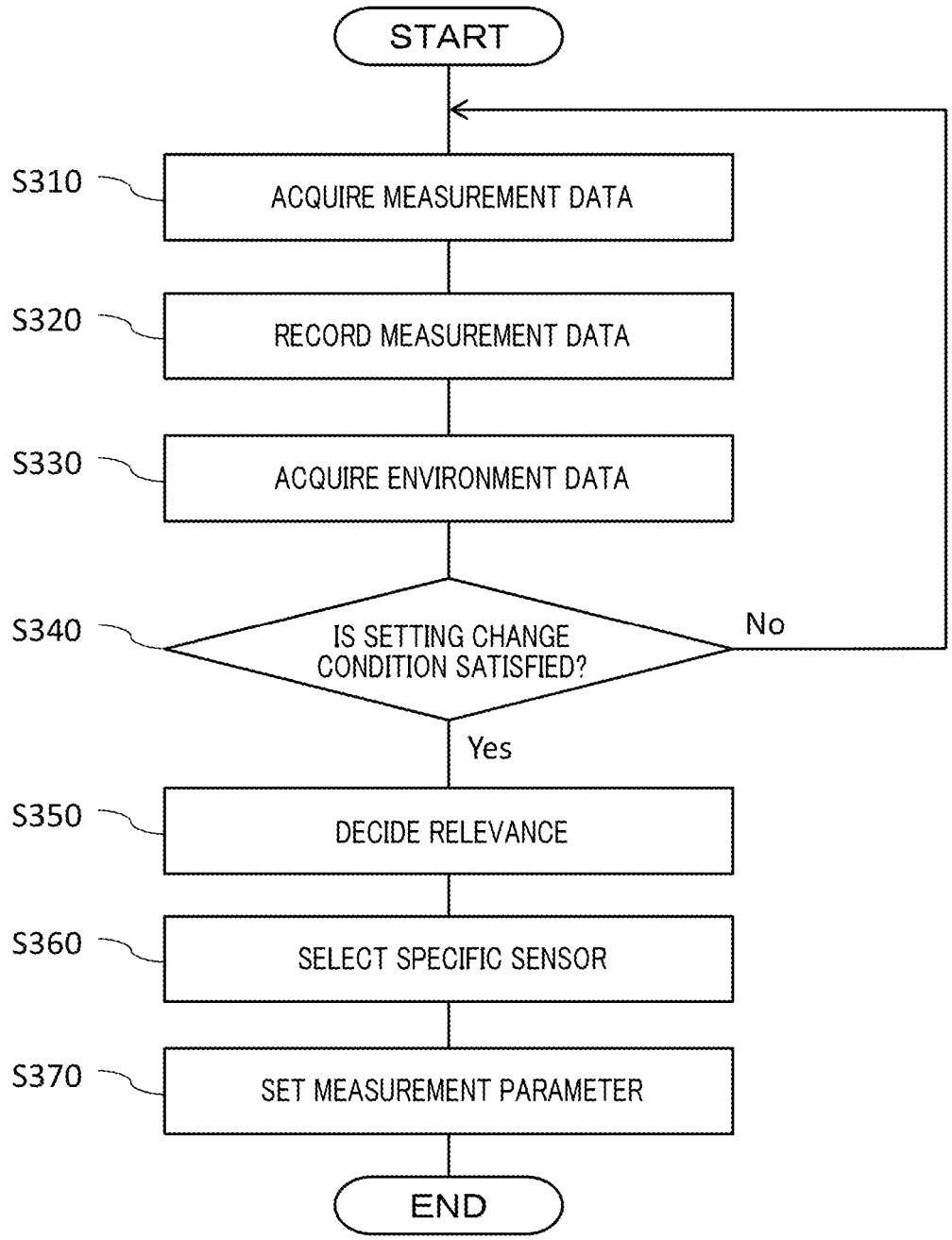
FIG. 3 illustrates one example of a flow for the data management system 100 according to the present embodiment to set a measurement parameter based on environment data.

FIG. 3 illustrates one example of a flow for the data management system 100 according to the present embodiment to set the measurement parameter based on the environment data.

In step 310, the data management system 100 acquires the measurement data. As one example, the measurement data acquisition unit 110 acquires the measurement data obtained by measuring the production target from each of the plurality of measurement sensors 20 in time series via the communication network. At this time, the measurement data acquisition unit 110 may acquire, from each of the plurality of measurement sensors 20, the measurement data such as the flow rate, the pressure, the temperature, and a combination of these, for example, in the production targets, that is, the raw materials M and N, the semifinished product, and the products X and Y flowing through the flow channels A, B, and C. The measurement data acquisition unit 110 supplies the measurement data acquired from each of the plurality of measurement sensors 20 to the data recording unit 120 and the sensor selection unit 140.

In step 320, the data management system 100 records the measurement data. As one example, the data recording unit 120 records the measurement data acquired by the measurement data acquisition unit 110 from each of the plurality of measurement sensors 20 in step 310 in time series for each of the measurement sensors 20.

In step 330, the data management system 100 acquires the environment data. As one example, the environment data acquisition unit 130 acquires the environment data obtained by measuring the production environment where the product is produced from the raw material from each of the plurality of environment sensors 30 in time series via the communication network. At this time, the environment data acquisition unit 130 may acquire at least any of a vibration, a temperature, a humidity, an illuminance, an odor, a gas concentration, a pressure, an air pressure, a stress, a magnetic field, a sound, and an image in the production environment, for example, as the environment data. As one example, the environment data acquisition unit 130 acquires the environment data obtained by measuring the vibration in the production environment from the environment sensor 30i. In addition, the environment data acquisition unit 130 acquires the environment data obtained by measuring the gas concentration in the production environment from the environment sensor 30j. In addition, the environment data acquisition unit 130 acquires the environment data obtained by measuring the sound in the production environment from the environment sensor 30k. In addition, the environment data acquisition unit 130 acquires the environment data obtained by measuring the temperature in the production environment from the environment sensor 301. The environment data acquisition unit 130 supplies the environment data acquired from each of the plurality of environment sensors 30 to the sensor selection unit 140. Note that, in the present drawing, a case where the data management system 100 acquires the environment data after acquiring the measurement data has been illustrated as one example, but the case is not limited to this. The data management system 100 may acquire the measurement data after acquiring the environment data. That is, step 330 may be performed before step 310 and step 320.

In step 340, the data management system 100 determines whether a setting change condition is satisfied. As one example, the sensor selection unit 140 collates the environment data supplied from the environment data acquisition unit 130 in step 330 with a reference corresponding to each of the plurality of environment sensors 30. When the environment data where a status is changed after the collation with the reference corresponding to each of the environment sensors exists, the environment data acquisition unit 130 then determines that the setting change condition is satisfied.

For example, the sensor selection unit 140 collates vibration data acquired from the environment sensor 30i with a predetermined reference corresponding to the environment sensor 30i. When it is detected that the vibration data changes from being in a predetermined range to being out of the range, then the sensor selection unit 140 may determine that the setting change condition of the measurement parameter (for example, a condition for setting the measurement parameter as a first value different from an initial value) is satisfied. That is, when the vibration out of an allowable range in the production environment is detected based on the environment data, the sensor selection unit 140 may determine that the setting change condition of the measurement parameter is satisfied. In addition, subsequently, when it is detected that a state where the vibration data is in the above-described predetermined range continues for a certain period, the sensor selection unit 140 may determine that a condition for initializing the measurement parameter (for example, a condition for restoring the measurement parameter from the first value to the initial value) is satisfied. That is, when the vibration out of the allowable range in the production environment is not detected for the certain period based on the environment data, the sensor selection unit 140 may determine that the condition for initializing the measurement parameter is satisfied. Furthermore, in a steady state, for example, when it is detected that a state where the vibration data is in a stable range identical to or different from the above-described predetermined range continues for the certain period, the sensor selection unit 140 may determine that the setting change condition of the measurement parameter (for example, a condition for setting the measurement parameter as a second value different from the initial value) is satisfied.

Similarly, the sensor selection unit 140 collates gas concentration data acquired from the environment sensor 30j with a predetermined reference corresponding to the environment sensor 30j. When it is detected that a concentration of a specific gas component in the gas concentration data acquired from the environment sensor 30j changes from being in a predetermined range to being out of the range, then the sensor selection unit 140 may determine that the setting change condition of the measurement parameter is satisfied. That is, when gas leakage in the production environment is detected based on the environment data, the sensor selection unit 140 may determine that the setting change condition of the measurement parameter is satisfied. In addition, subsequently, when it is detected that a state where the concentration of the specific gas component is in the above-described predetermined range continues for a certain period, the sensor selection unit 140 may determine that the condition for initializing the measurement parameter is satisfied. That is, when the gas leakage in the production environment is not detected for the certain period based on the environment data, the sensor selection unit 140 may determine that the condition for initializing the measurement parameter is satisfied. Furthermore, in the steady state, for example, when it is detected that a state where the gas concentration data is in a stable range identical to or different from the above-described predetermined range continues for the certain period, the sensor selection unit 140 may determine that the setting change condition of the measurement parameter is satisfied.

Similarly, the sensor selection unit 140 collates sound data acquired from the environment sensor 30k with a predetermined reference corresponding to the environment sensor 30k. When it is detected that the sound data acquired from the environment sensor 30k changes from being in a predetermined range to being out of the range, then the sensor selection unit 140 may determine that the setting change condition of the measurement parameter is satisfied. That is, when an abnormal sound in the production environment (for example, an explosive sound, a burst sound, or the like) is detected based on the environment data, the sensor selection unit 140 may determine that the setting change condition of the measurement parameter is satisfied. In addition, when it is detected that a state where the sound data is in the above-described predetermined range continues for a certain period, the sensor selection unit 140 may determine that the condition for initializing the measurement parameter is satisfied. That is, when the abnormal sound in the production environment is not detected for the certain period based on the environment data, the sensor selection unit 140 may determine that the condition for initializing the measurement parameter is satisfied. Furthermore, in the steady state, for example, when it is detected that a state where the sound data is in a stable range identical to or different from the above-described predetermined range continues for the certain period, the sensor selection unit 140 may determine that the setting change condition of the measurement parameter is satisfied.

Similarly, the sensor selection unit 140 collates temperature data acquired from the environment sensor 30*l* with a predetermined reference corresponding to the environment sensor 30*l*. When it is detected that the temperature data acquired from the environment sensor 30*l* changes from being in a predetermined range to being out of the range, then the sensor selection unit 140 may determine that the setting change condition of the measurement parameter is satisfied. That is, when a temperature out of the allowable range in the production environment is detected based on the environment data (for example, when it is detected that a surface temperature in specific equipment or a surrounding temperature turns to a high temperature exceeding a predetermined threshold), the sensor selection unit 140 may determine that the setting change condition of the measurement parameter is satisfied. In addition, subsequently, when it is detected that a state where the temperature data is in the above-described predetermined range continues for a certain period, the sensor selection unit 140 may determine that the condition for initializing the measurement parameter is satisfied. That is, when the temperature out of the allowable range in the production environment is not detected for the certain period based on the environment data, the sensor selection unit 140 may determine that the condition for initializing the measurement parameter is satisfied. Furthermore, in the steady state, for example, when it is detected that a state where the temperature data is in a stable range identical to or different from the above-described predetermined range continues for the certain period, the sensor selection unit 140 may determine that the setting change condition of the measurement parameter is satisfied.

When it is determined that the setting change condition of the measurement parameter is not satisfied in step 340 (No), the data management system 100 returns the processing to step 310, and the flow continues. On the other hand, when it is determined that the setting change condition of the measurement parameter is satisfied in step 340 (Yes), the data management system 100 advances the processing to step 350.

In step 350, the data management system 100 decides a relevance. As one example, the sensor selection unit 140 decides a relevance between the environment sensor 30 that has measured the environment data used when it is determined that the setting change condition of the measurement parameter is satisfied in step 340 and each of the plurality of measurement sensors 20.

For example, when the vibration out of the allowable range in the production environment is detected in step 340, the sensor selection unit 140 decides the relevance between the environment sensor 30*i* that has measured the vibration data used when the vibration is detected and each of the plurality of measurement sensors 20. At this time, the sensor selection unit 140 may decide the relevance of the measurement sensor 20 based on a distance from the environment sensor 30*i* as one example. That is, the sensor selection unit 140 may decide a scored relevance (for example, from 1 to 0) for each of the plurality of measurement sensors 20 according to a distance from a position where the environment sensor 30*i* is disposed to a position where each of the plurality of measurement sensors 20 is disposed. In this case, the sensor selection unit 140 may decide the relevance for each of the plurality of measurement sensors 20 such that the relevance is higher (for example, closer to 1) as the distance is shorter, and the relevance is lower (for example, closer to 0) as the distance is longer.

Note that in the above-described explanation, a case where the relevance is decided based on the distance between the position where the environment sensor 30*i* set as the target is disposed and the position where the measurement sensor 20 is disposed has been illustrated as one example. However, the case is not limited to this. Instead of, or in addition to, the above-described explanation, the sensor selection unit 140 may decide the relevance based on a distance between the position where the environment sensor 30*i* set as the target is disposed and the flow channel. That is, the sensor selection unit 140 may decide the relevance for each of the plurality of measurement sensors 20 such that the relevance is higher for the measurement sensor 20 disposed on the flow channel at a shorter distance from the environment sensor 30*i* set as the target (for example, the flow channel A), and the relevance is lower for the measurement sensor 20 disposed on the flow channel at a longer distance from the environment sensor 30*i* set as the target.

In addition, for example, when a temperature out of the allowable range in the production environment is detected in step 340, the sensor selection unit 140 decides the relevance between the environment sensor 30*l* that has measured the temperature data used when the temperature is detected and each of the plurality of measurement sensors 20. As one example, when the environment sensor 30*l* measures a surface temperature at a pipe of the flow channel C, the sensor selection unit 140 may decide the relevance such that the relevance is higher for the measurement sensor 20*c* disposed on the flow channel than the measurement sensors 20*a* and 20*b* disposed on the other flow channels A and B. In this case too, the sensor selection unit 140 may decide the scored relevance for each of the plurality of measurement sensors 20*c* disposed on the flow channel C according to a distance from a position where the environment sensor 30*l* is disposed to the position where each of the plurality of measurement sensors 20*c* is disposed.

Instead of, or in addition to, this configuration, as one example, the sensor selection unit 140 may decide the relevance of the measurement sensor 20 based on a type of a physical quantity measured by the environment sensor 30. For example, when gas leakage in the production environment is detected in step 340, the relevance may be decided for each of the plurality of measurement sensors 20 such that the relevance is higher for the measurement sensor 20 more responsible for a component the gas leakage of which is detected, and the relevance is lower for the less responsible measurement sensor 20. That is, when a specific gas component the gas leakage of which is detected is attributed to the raw material M, the sensor selection unit 140 may decide the relevance such that the relevance is higher for the measurement sensor 20$a$ disposed on the flow channel A and the measurement sensors 20$b3$, 20$b4$, and 20$b5$ disposed downstream relative to a merging point with the flow channel A on the flow channel B than the measurement sensor 20$c$ disposed on the flow channel C and the measurement sensors 20$b1$ and 20$b2$ disposed upstream relative to the merging point with the flow channel A on the flow channel B. In other words, the sensor selection unit 140 may decide the relevance for each of the plurality of measurement sensors 20 according to an association between a type of the physical quantity measured by the environment sensor 30 and a measurement target measured by the measurement sensor 20 (for example, a raw material, a semifinished product, a product, and the like).

In addition, when an abnormal sound in the production environment is detected in step 340, the sensor selection unit 140 may decide the relevance such that the relevance is higher for the measurement sensor 20 measuring the pressure as the physical quantity among the plurality of measurement sensors 20 than the measurement sensors 20 measuring the flow rate and the temperature as the physical quantity among the plurality of measurement sensors 20. In other words, the sensor selection unit 140 may decide the relevance for each of the plurality of measurement sensors 20 according to an association between a type of the physical quantity measured by the environment sensor 30 and a type of the physical quantity measured by the measurement sensor 20.

Instead of, or in addition to, this configuration, as one example, the sensor selection unit 140 may decide the relevance of the measurement sensor 20 based on a correlation between a time-series change of the environment data measured by the environment sensor 30 and a time-series change of the measurement data measured by the measurement sensor 20. For example, when an abnormal sound in the production environment is detected in step 340, the relevance may be decided such that the relevance is higher for the measurement sensor 20 where a characteristic of the time-series change of the measurement data varies since timing at which the abnormal sound is generated than the measurement sensor 20 where the characteristic of the time-series change does not vary. That is, a case is considered that when an abnormal sound is detected based on the environment data from the environment sensor 30$k$, the characteristic of the time-series change of the measurement data of the measurement sensor 20$a$ disposed on the flow channel A and the measurement sensor 20$b$ disposed on the flow channel B does not vary before and after the generation of the abnormal sound, but on the other hand, the characteristic of the time-series change of the measurement data of the measurement sensor 20$c$ disposed on the flow channel C varies before and after the generation of the abnormal sound. In this case, the sensor selection unit 140 may decide the relevance such that the relevance is higher for the measurement sensor 20$c$ than the measurement sensors 20$a$ and 20$b$.

In this manner, the sensor selection unit 140 decides the relevance for each of the plurality of measurement sensors 20 by one or a plurality of indicators. Note that when the relevance is decided by the plurality of indicators, the sensor selection unit 140 may decide respective relevances for each of the plurality of indicators. Alternatively, the sensor selection unit 140 may decide one relevance by calculating (for example, multiplying) the respective relevances decided by the plurality of indicators. At this time, the sensor selection unit 140 may use a different weighting for each indicator when one relevance is decided by calculating the respective relevances.

In step 360, the data management system 100 selects a specific sensor. As one example, the sensor selection unit 140 selects the specific sensor from among the measurement sensors 20 measuring the production target serving as the target of the production according to the relevance with respect to the environment sensor 30. For example, the sensor selection unit 140 may select one or a plurality of measurement sensors 20 the relevance of which decided in step 350 exceeds a predetermined threshold (such as the measurement sensor 20 having the relevance of 0.8 or above) as the specific sensors. Instead of, or in addition to, this configuration, the sensor selection unit 140 may select one or a plurality of measurement sensors 20 the relevance of which decided in step 350 is relatively high (such as the top two measurement sensors 20 having the high relevance) as the specific sensors. The sensor selection unit 140 supplies information related to the selected specific sensor to the parameter setting unit 150.

In step 370, the data management system 100 sets a measurement parameter. As one example, the parameter setting unit 150 acquires information related to the specific sensor selected in step 360. Then, the parameter setting unit 150 sets the measurement parameter in the specific sensor based on the environment data. At this time, the parameter setting unit 150 may set a cycle for measuring the production target as the measurement parameter for the specific sensor to measure the production environment, for example. In addition, the parameter setting unit 150 may set a sensitivity for measuring the production target as the measurement parameter for the specific sensor to measure the production environment, for example.

That is, when the measurement sensor 20$b4$ and 20$b3$ at a relatively short distance from the environment sensor 30$i$ are selected as the specific sensors in a case where the vibration out of the allowable range in the production environment is detected based on the environment data from the environment sensor 30$i$, the parameter setting unit 150 may set the measurement parameter such that a cycle for these specific sensors to measure the production target is set as a first value shorter than a value before the setting change (initial value). Similarly, when the measurement sensor 20$b4$ and 20$b3$ at a relatively short distance from the environment sensor 30$i$ are selected as the specific sensors in a case where the vibration out of the allowable range in the production environment is detected based on the environment data from the environment sensor 30$i$, the parameter setting unit 150 may set the measurement parameter such that a sensitivity for these specific sensors to measure the production target is set as a first value higher than a value before the setting change (initial value). At this time, the parameter setting unit 150 may set the measurement parameter according to the relevance for the specific sensors. As one example, when the relevance of the measurement sensor 20$b4$ is higher than the relevance of the measurement sensor 20$b3$, the parameter setting unit 150 may set the measurement parameter for these specific sensors such that a rate of change before and after the setting change of the measurement parameter of the measurement sensor 20$b4$ is larger than a rate of change before and after the setting change of the measurement parameter of the measurement sensor 20$b3$. In this manner, the parameter setting unit 150 may change the measurement parameter in the specific sensor when the environment data is out of the predetermined range.

In addition, subsequently, when the vibration out of the allowable range in the production environment is not detected for a certain period based on the environment data from the environment sensor 30i, the parameter setting unit 150 may change the measurement parameter such that these specific sensors have the value before the setting change (initial value). In this manner, the parameter setting unit 150 may initialize the measurement parameter when the environment data is in the predetermined range. Note that in the above-described explanation, a case where the parameter setting unit 150 initializes the measurement parameter by restoring the measurement parameter in the specific sensors to the value before the setting change has been illustrated as one example. However, the case is not limited to this. The parameter setting unit 150 may initialize the measurement parameter by restoring the measurement parameter in the specific sensors to the value at the operation start of the plant 10. Furthermore, in the steady state, when a state where the vibration in the production environment is in a stable range continues for a certain period based on the environment data from the environment sensor 30i, the parameter setting unit 150 may set the measurement parameter such that the cycle for measuring the production target is set as a second value longer than the value before the setting change (initial value) for these specific sensors. Similarly, in the steady state, when a state where the vibration in the production environment is in a stable range continues for a certain period based on the environment data from the environment sensor 30i, the parameter setting unit 150 may set the measurement parameter such that the sensitivity for measuring the production target is set as a second value lower than the value before the setting change (initial value) for these specific sensors.

Then, the parameter setting unit 150 supplies the setting information related to the measurement parameter set in this manner to the data recording unit 120. Note that such setting information may include information indicating at which timing the measurement parameter is changed as described above. According to this configuration, the data recording unit 120 may further record information indicating the timing of the setting change of the measurement parameter in addition to the measurement data.

Up to now, a technique for acquiring information, which used to be attained based on a sensory of an operator, from a measurement result of a sensor has been developed. According to the above-mentioned technique in the related art, such information is additionally acquired to determine an operational state of equipment. In contrast, the data management system 100 according to the present embodiment acquires the environment data from the environment sensor 30. Then, the data management system 100 selects a specific sensor from among the measurement sensors 20 according to the relevance with respect to the environment sensor 30 and sets the measurement parameter in the specific sensor based on the environment data. Thus, in accordance with the data management system 100 according to the present embodiment, the setting change of the measurement parameter of the measurement sensor 20, which has been fixedly set or manually set based on an experience or a hunch of the operator up to now, can be appropriately performed based on the environment data acquired from the environment sensor 30. In addition, at this time, the data management system 100 according to the present embodiment acquires at least any of a vibration, a temperature, a humidity, an illuminance, an odor, a gas concentration, a pressure, an air pressure, a stress, a magnetic field, a sound, and an image in the production environment as the environment data. Thus, in accordance with the data management system 100 according to the present embodiment, the measurement parameter can be set by taking into account not only a state detected by five senses of the operator but also a state that is not to be detected by the human sensory alone. In addition, the data management system 100 according to the present embodiment decides the relevance based on the distance from the environment sensor 30, the type of the physical quantity measured by the environment sensor 30, and the correlation between the time-series change of the environment data and the time-series change of the measurement data, for example. Thus, in accordance with the data management system 100 according to the present embodiment, when the measurement parameter is to be changed, the specific sensor set as the target can be automatically selected from among the plurality of measurement sensors 20 according to an objective indicator. In addition, the data management system according to the present embodiment changes the measurement parameter when the environment data is out of the predetermined range. At this time, the data management system 100 according to the present embodiment sets the cycle or the sensitivity for measuring the production target as the measurement parameter, for example. Thus, in accordance with the data management system 100 according to the present embodiment, when the environment data is out of the predetermined range, that is, when some abnormality is detected in the production environment, the measurement sensor 20 performs the setting change of the cycle or the sensitivity for measuring the production target, so that it is possible to cause the measurement sensor 20 to execute the measurement of the production target under a measurement condition appropriate to the state of the production environment. In addition, the data management system 100 according to the present embodiment subsequently initializes the measurement parameter when the environment data is in the predetermined range. Thus, in accordance with the data management system 100 according to the present embodiment, when the production environment returns to the steady state, it is possible to cause the measurement sensor 20 to execute the measurement of the production target under the initially set setting change condition. In addition, the data management system 100 according to the present embodiment further includes the measurement data acquisition unit 110 and the data recording unit 120. Thus, in accordance with the data management system 100 according to the present embodiment, a function as a data logger and a setting function of the measurement parameter can be achieved by the identical system. In addition, in the data management system 100 according to the present embodiment, the data recording unit 120 further records the information indicating the timing of the setting change of the measurement parameter together with the measurement data. Thus, in accordance with the data management system 100 according to the present embodiment, the measurement data recorded in time series and the timing of the setting change of the measurement parameter can be associated with each other, and it is possible to recognize under which setting condition the measurement data at each time instance is measured.

Figure 4:
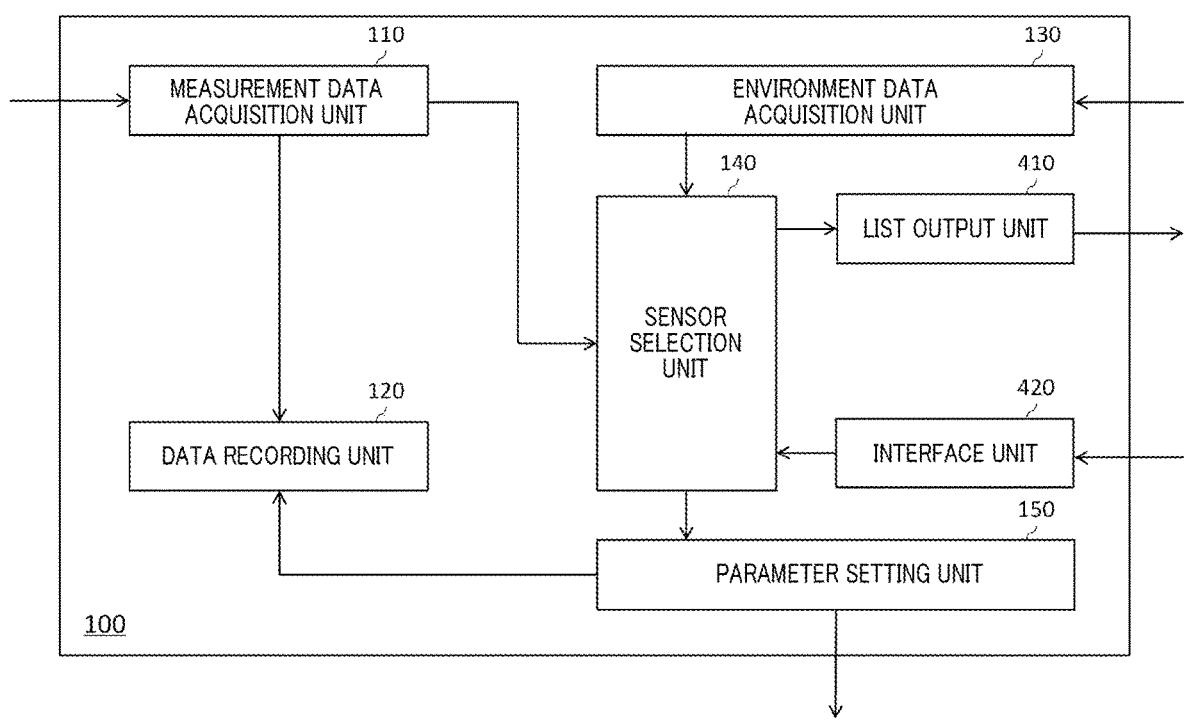
FIG. 4 illustrates one example of a block diagram of the data management system 100 according to a modified example of the present embodiment.

FIG. 4 illustrates one example of a block diagram of the data management system 100 according to a modified example of the present embodiment. In FIG. 4, a part having the same function and configuration as FIG. 1 is assigned with the same reference sign, and descriptions will be omitted except for differences. The data management system 100 according to the present modified example further includes a list output unit 410 and an interface unit 420.

In the above-described explanation, a case where the sensor selection unit 140 automatically selects the specific sensor based on the relevance decided for each of the plurality of measurement sensors 20 has been illustrated as one example. However, in the data management system 100 according to the present modified example, after the sensor selection unit 140 decides the relevance for each of the plurality of measurement sensors 20, the sensor selection unit 140 supplies information related to one or a plurality of candidate sensors having the relevance higher than a predetermined threshold to the list output unit 410.

The list output unit 410 is configured to output the list of the candidate sensors corresponding to the measurement sensor 20 having the relevance higher than the predetermined threshold. As one example, the list output unit 410 may be a display unit configured to display a list of the candidate sensors which is supplied from the sensor selection unit 140. However, the configuration is not limited to this. The list output unit 410 may be a communication unit, for example, and may transmit the list of the candidate sensors which is supplied from the sensor selection unit 140 to another system.

The interface unit 420 is configured to accept a user input. As one example, the interface unit 420 acquires an input from a user who browses the list of the candidate sensors via a graphical user interface (GUI). For example, the interface unit 420 acquires, via the GUI, information related to which of the measurement sensors 20 is selected as the specific sensor by the user from the list of the candidate sensors.

Then, in the data management system 100 according to the present modified example, the sensor selection unit 140 selects the specific sensor from among the candidate sensors according to a user input. As one example, the sensor selection unit 140 selects one or a plurality of measurement sensors 20 selected by the user from among the candidate sensors as the specific sensors.

Note that in the data management system 100 according to the present modified example, the sensor selection unit 140 may decide the relevance of the measurement sensor 20 based on an actual record of being selected as the specific sensor. In the data management system 100 according to the present modified example, the sensor selection unit 140 can find out which of the measurement sensors 20 is actually selected as the specific sensor by the user from among the candidate sensors by the user input via the interface unit 420. That is, the sensor selection unit 140 can find out the actual record of being selected as the specific sensor. Therefore, the sensor selection unit 140 may decide the relevance with respect to the environment sensor 30 set as the target, for example, based on the actual record such that the relevance is higher for the measurement sensor 20 having the actual record of being selected as the specific sensor in the past than the measurement sensor 20 having no actual record of being selected as the specific sensor.

FIG. 5 illustrates one example of the list of the candidate sensors which is output by the data management system 100 according to the modified example of the present embodiment. In the present drawing, the top five measurement sensors 20 having the high relevance with respect to the environment sensor 30$i$ are listed as the candidate sensors. As illustrated in the present drawing, the list output unit 410 may associate the relevance with identification information for identifying the measurement sensor 20, for example, to output the list of the candidate sensors listed in a descending order of the relevance. Then, the interface unit 420 may acquire, via the GUI, for example, the information related to which of the measurement sensors 20 is selected (in the present drawing, the measurement sensors 20$b$4 and 20$a$1) as the specific sensor by the user from the list of the candidate sensors.

The data management system 100 according to the present modified example outputs the list of the candidate sensors. Then, the data management system 100 according to the present modified example selects the specific sensor from among the candidate sensors according to the user input. Thus, in accordance with the data management system 100 according to the present modified example, the candidate list having the high relevance is provided to the user in the selection of the specific sensor, and also an intention of the user can be reflected in the actual sensor selection. In addition, the data management system 100 according to the present modified example decides the relevance based on the actual record of being selected as the specific sensor. Thus, in accordance with the data management system 100 according to the present modified example, the relevance for each of the plurality of measurement sensors 20 can be decided by also taking into account the actual record in the past.

Various embodiments of the present invention may be described with reference to flowcharts and block diagrams whose blocks may represent (1) steps of processes in which operations are performed or (2) sections of devices responsible for performing operations. Certain steps and sections may be implemented by a dedicated circuit, programmable circuitry supplied with computer-readable instructions stored on computer-readable media, and/or processors supplied with computer-readable instructions stored on computer-readable media. A dedicated circuit may include digital and/or analog hardware circuits and may include integrated circuits (IC) and/or discrete circuits. Programmable circuitry may include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 6:
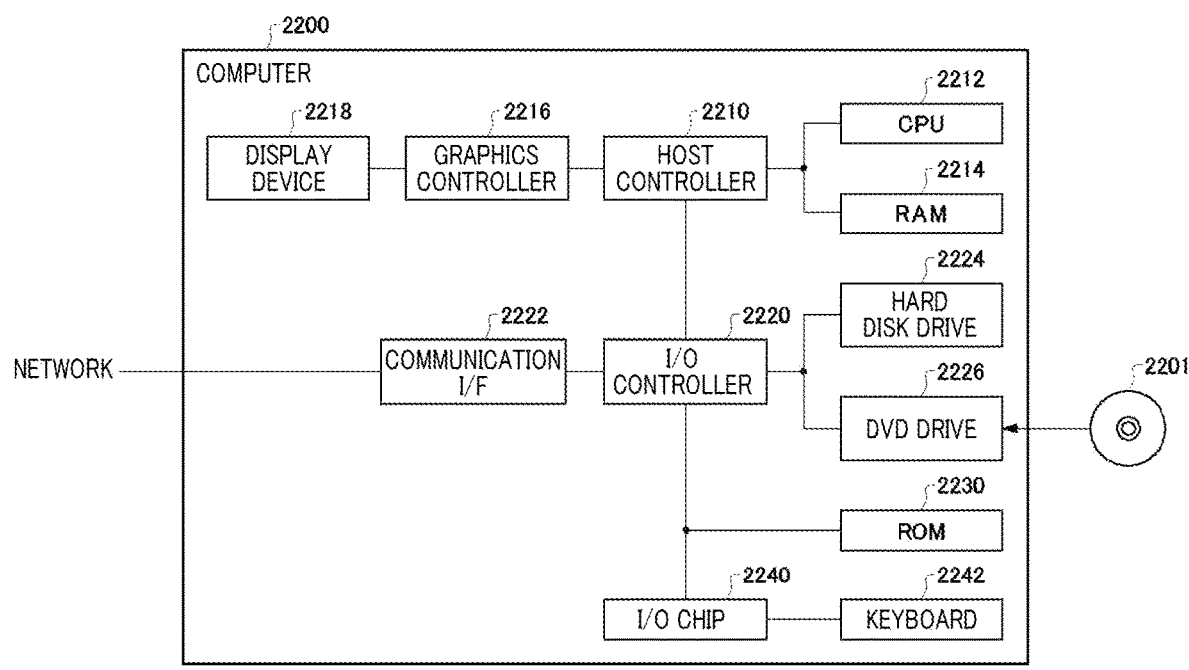
FIG. 6 illustrates an example of a computer 2200 in which an entirety or a part of a plurality of aspects of the present invention may be embodied.

FIG. 6 illustrates an example of a computer 2200 through which a plurality of aspects of the present invention may be entirely or partially embodied. A program that is installed in the computer 2200 can cause the computer 2200 to function as or perform operations associated with apparatuses of the embodiments of the present invention or one or more sections thereof, or perform the operations or the one or more sections, and/or cause the computer 2200 to perform processes of the embodiments of the present invention or steps of the processes. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, or the like to the input/output controller 2220.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable media on the computer 2200 or near the computer 2200. In addition, a recording medium such as a hard disk or a RAM provided in a server system connected to a dedicated communication network or the Internet can be used as the computer-readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 plant
20 measurement sensor
30 environment sensor
100 data management system
110 measurement data acquisition unit
120 data recording unit
130 environment data acquisition unit
140 sensor selection unit
150 parameter setting unit
410 list output unit
420 interface unit
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. A data management system comprising:
an environment data acquisition unit configured to acquire, from an environment sensor, environment data relating to at least one of a vibration, a temperature, a humidity, an illuminance, an odor, a gas concentration, a pressure, an air pressure, a stress, a magnetic field, a sound, and an image being outside a predetermined range, the environment data obtained by measuring a production environment where a product is produced from a raw material;
a sensor selection unit configured to select, when the environment data acquisition unit indicates the environment data of a first time period is outside the predetermined range, a specific sensor from among measurement sensors based on distance to the environment sensor, type of the physical quantity measured by the environment sensor, and a correlation between a time-series change of the environment data measured by the environment sensor and a time-series change of measurement data measured by the selected specific sensor, each of which is configured to measure a production target serving as a target of the production, according to a relevance with respect to the environment sensor; and
a parameter setting unit configured to set, when the environment data acquisition unit indicates the environment data has returned to the predetermined range, an initial measurement parameter in the selected specific sensor based on the environment data that has returned to the predetermined range.

2. The data management system according to claim 1, wherein the sensor selection unit is configured to decide the relevance of the selected specific sensor based on the distance from the environment sensor.

3. The data management system according to claim 2, wherein the sensor selection unit is configured to decide the relevance of the selected specific sensor based on the type of the physical quantity measured by the environment sensor.

4. The data management system according to claim 2, wherein the sensor selection unit is configured to decide the relevance of the selected specific sensor based on the correlation between the time-series change of the environment data measured by the environment sensor and the time-series change of measurement data measured by the measurement sensor.

5. The data management system according to claim 2, wherein the sensor selection unit is configured to decide the relevance of the selected specific sensor based on an actual record of being selected as the specific sensor.

6. The data management system according to claim 2, further comprising:
a list output unit configured to output a list of candidate sensors as the selected specific sensor having the relevance higher than a predetermined threshold, wherein the sensor selection unit is configured to select the specific sensor from among the candidate sensors according to a user input.

7. The data management system according to claim 2, wherein the parameter setting unit is configured to change the measurement parameter when the environment data is out of a predetermined range.

8. The data management system according to claim 1, wherein the sensor selection unit is configured to decide the relevance of the selected specific sensor based on the type of the physical quantity measured by the environment sensor.

9. The data management system according to claim 1, wherein the sensor selection unit is configured to decide the relevance of the selected specific sensor based on the correlation between the time-series change of the environment data measured by the environment sensor and the time-series change of measurement data measured by the measurement sensor.

10. The data management system according to claim 1, wherein the sensor selection unit is configured to decide the relevance of the selected specific sensor based on an actual record of being selected as the specific sensor.

11. The data management system according to claim 1, further comprising:
a list output unit configured to output a list of candidate sensors as the specific sensor having the relevance higher than a predetermined threshold, wherein the sensor selection unit is configured to select the specific sensor from among the candidate sensors according to a user input.

12. The data management system according to claim 1, wherein the parameter setting unit is configured to change the measurement parameter when the environment data is out of a predetermined range.

13. The data management system according to claim 12, wherein the parameter setting unit is configured to initialize the measurement parameter when the environment data is within the predetermined range.

14. The data management system according to claim 1, wherein the parameter setting unit is configured to set a cycle for measuring the production target as the measurement parameter.

15. The data management system according to claim 1, wherein the parameter setting unit is configured to set a sensitivity for measuring the production target as the measurement parameter.

16. The data management system according to claim 1, further comprising:
a measurement data acquisition unit configured to acquire measurement data obtained by measuring the production target from the selected specific sensor; and
a data recording unit configured to record the measurement data.

17. The data management system according to claim 16, wherein the data recording unit is configured to further record information indicating timing of setting change of the measurement parameter.

18. A data management method comprising:
acquiring, from an environment sensor, environment data relating to at least one of a vibration, a temperature, a humidity, an illuminance, an odor, a gas concentration, a pressure, an air pressure, a stress, a magnetic field, a sound, and an image being outside a predetermined range, the environment data obtained by measuring a production environment where a product is produced from a raw material;
determining that the environment data acquisition unit indicates the environment data is outside the predetermined range during a first time period, selecting, in response to determining that the environment data acquisition unit indicates the environment data is outside the predetermined range during the first time period, a specific sensor from among measurement sensors based on distance to the environment sensor, type of the physical quantity measured by the environment sensor, and a correlation between a time-series change of the environment data measured by the environment sensor and a time-series change of measurement data measured by the selected specific sensor, each of which is configured to measure a production target serving as a target of the production, according to a relevance with respect to the environment sensor; and
determining that the environment data acquisition unit indicates the environment data has returned to the predetermined range during a second time period, setting, in response to determining that the environment data acquisition unit indicates the environment data has returned to the predetermined range during the second time period, an initial measurement parameter in the selected specific sensor based on the environment data that has returned to the predetermined range.

19. A non-transitory computer-readable recording medium having recorded thereon a data management program that, when executed by a computer, causes the computer to function as:
an environment data acquisition unit configured to acquire, from an environment sensor, environment data relating to at least one of a vibration, a temperature, a humidity, an illuminance, an odor, a gas concentration, a pressure, an air pressure, a stress, a magnetic field, a sound, and an image being outside a predetermined range, the environment data obtained by measuring a production environment where a product is produced from a raw material;
a sensor selection unit configured to select, when the environment data acquisition unit indicates the environment data is outside the predetermined range, a specific sensor from among measurement sensors based on distance to the environment sensor, type of the physical quantity measured by the environment sensor, and a correlation between a time-series change of the environment data measured by the environment sensor and a time-series change of measurement data measured by the selected specific sensor, each of which is configured to measure a production target serving as a target of the production, according to a relevance with respect to the environment sensor; and
a parameter setting unit configured to set, when the environment data acquisition unit indicates the environment data has returned to the predetermined range, an initial measurement parameter in the selected specific sensor based on the environment data that has returned to the predetermined range.

* * * * *